US012606729B2

(12) United States Patent
Fischer et al.

(10) Patent No.: US 12,606,729 B2
(45) **Date of Patent: *Apr. 21, 2026**

(54) USE OF POLYMERIC-INORGANIC NANOPARTICLE COMPOSITIONS AS HEAT TRANSFER FLUIDS IN BATTERY OR OTHER ELECTRICAL EQUIPMENT SYSTEMS

(71) Applicants: Evonik Operations GmbH, Essen (DE); Cornelia Schrantz, Mörsfeld (DE); Raphaela Schrantz, Siefersheim (DE)

(72) Inventors: Ulrich Fischer, Mömbris (DE); Daniel Ness, Hanau (DE); Stephan Wieber, Karlsruhe (DE); Michael Gerhard Hagemann, Shanghai (CN); Günter Schmitt, Darmstadt (DE); Jennifer Schrantz, Wendelsheim (DE); Katharina Dauth, Offenbach (DE); Can Metehan Turhan, Dieburg (DE)

(73) Assignee: Evonik Operations GmbH, Essen (DE)

( * ) Notice: Subject to any disclaimer, the term of this patent is extended or adjusted under 35 U.S.C. 154(b) by 889 days.

This patent is subject to a terminal disclaimer.

(21) Appl. No.: 17/621,017

(22) PCT Filed: Jul. 13, 2020

(86) PCT No.: PCT/EP2020/069744

§ 371 (c)(1),
(2) Date: Dec. 20, 2021

(87) PCT Pub. No.: WO2021/009115

PCT Pub. Date: Jan. 21, 2021

(65) Prior Publication Data

US 2022/0332998 A1 Oct. 20, 2022

(30) Foreign Application Priority Data

Jul. 17, 2019 (EP) .................................... 19186771

(51) Int. Cl.

| | |
|---|---|
| ***C09K 5/10*** | (2006.01) |
| ***B82Y 40/00*** | (2011.01) |
| ***C08L 33/10*** | (2006.01) |
| ***H01M 10/6567*** | (2014.01) |

(52) U.S. Cl.

CPC ................ *C09K 5/10* (2013.01); *C08L 33/10* (2013.01); *H01M 10/6567* (2015.04); *B82Y 40/00* (2013.01); *C08L 2205/025* (2013.01)

(58) Field of Classification Search

CPC .. C09K 5/10; C09K 5/14; C08L 33/10; C08L 2205/025; H01M 10/6567; H01M 6/5038; H01M 8/04029; H01M 10/613; H01M 10/625; H01M 10/656; H01M 2220/20; B82Y 40/00; H01G 11/82; H01G 11/78; H01G 11/18; H01G 11/14; H01G 11/80; Y02E 60/10; C08C 19/00; C08F 212/08; C08F 220/1804; C08F 220/1812; C08F 220/60; C08F 290/048

See application file for complete search history.

(56) References Cited

U.S. PATENT DOCUMENTS

| | | | | |
|---|---|---|---|---|
| 10,954,466 | B2 | 3/2021 | Sirak et al. | |
| 11,101,510 | B2 | 8/2021 | Kwon et al. | |
| 11,180,712 | B2 | 11/2021 | Wieber et al. | |
| 11,198,833 | B2 | 12/2021 | Wieber et al. | |
| 2017/0009120 | A1 | 1/2017 | Yang et al. | |
| 2019/0264127 | A1* | 8/2019 | Sirak ..................... | C08F 220/68 |

FOREIGN PATENT DOCUMENTS

| | | | | |
|---|---|---|---|---|
| EP | 3 531 499 A1 | 8/2019 | | |
| WO | 2013/115925 A1 | 8/2013 | | |
| WO | 2014/106556 A1 | 7/2014 | | |
| WO | WO-2018019783 A1 * | 2/2018 | ............ | C08F 220/68 |
| WO | 2019/107722 A1 | 6/2019 | | |
| WO | WO 2022/058095 A1 | 3/2022 | | |

OTHER PUBLICATIONS

Fischer et al., U.S. Appl. No. 17/616,769, filed Dec. 6, 2021.
International Search Report mailed on Oct. 15, 2020 in PCT/EP2020/069744 (4 pages).
Written Opinion mailed on Oct. 15, 2020 in PCT/EP2020/069744 (7 pages).
Breuers et al., U.S. Appl. No. 18/245,796, filed Mar. 17, 2023.
U.S. Appl. No. 18/245,796, filed Mar. 17, 2023, Breuers et al.
European Search Report mailed on Dec. 17, 2019 in EP 19186771.2 (9 pages).

(Continued)

*Primary Examiner* — Andrew J. Oyer
(74) *Attorney, Agent, or Firm* — Grüneberg Global IP, PLLC

(57) ABSTRACT

The invention relates to the use of a polymeric-inorganic nanoparticle composition as a heat transfer fluid in battery or other electrical equipment systems. The electrical equipment can be in particular electric batteries, electric motors, electric vehicle transmissions, electric transformers, electric capacitors, fluid-filled transmission lines, fluid-filled power cables, computers and power electronics such as electric power converters.

22 Claims, No Drawings

(56) References Cited

OTHER PUBLICATIONS

Inkyo et al., "Beads Mill-Assisted Synthesis of Poly Methyl Methacrylate (PMMA)-TiO2 Nanparticle Composites," Industrial & Engineering Chemistry Research, vol. 47, No. 8, Mar. 14, 2008, pp. 2597-2604 (8 pages).
T. Mang, W. Dresel (eds.): "Lubricants and Lubrication", Wiley-VCH, Weinheim 2001 (3 pages).
R. M. Mortier, S. T. Orszulik (eds.): "Chemistry and Technology of Lubricants" (3 pages).
PCT/EP2021/072411, Aug. 11, 2021, WO/2022/058095, Breuers et al.

* cited by examiner

USE OF POLYMERIC-INORGANIC NANOPARTICLE COMPOSITIONS AS HEAT TRANSFER FLUIDS IN BATTERY OR OTHER ELECTRICAL EQUIPMENT SYSTEMS

CROSS REFERENCE TO RELATED APPLICATIONS

This application is a 35 U.S.C. § 371 U.S. national phase entry of International Application No. PCT/EP2020/069744 having an international filing date of Jul. 13, 2020, which claims the benefit of European Application No. 19186771.2 filed Jul. 17, 2019, each of which is incorporated herein by reference in its entirety.

FIELD

The invention relates to the use of a polymeric-inorganic nanoparticle composition as a heat transfer fluid in battery or other electrical equipment systems. The electrical equipment can in particular be electric batteries, electric motors, electric vehicle transmissions, electric transformers, electric capacitors, fluid-filled transmission lines, fluid-filled power cables, computers and power electronics such as electric power converters.

BACKGROUND

In recent years, energy shortage and environmental concerns have had a tremendous impact on technological advancement. The increase of environmental awareness has led to a growing interest in so-called green technologies, especially in the automobile industry. The demand for emission-free vehicles fueled by renewable energy sources, such as pure electric vehicles (EVs), hybrid electric vehicles (HEVs) and fuel cell electric vehicles, has gradually become more significant and is anticipated to increase drastically in the next 20 years. The energy for such vehicles is provided and stored in batteries having a high specific energy density. Various batteries are available for EVs and HEVs, such as lead-acid, zinc/halogen, metal/air, sodium-beta, nickel metal hydride (Ni-MH) and lithium-ion (Li-ion).

To increase the performance of electric vehicles, large-scale batteries with a high current discharge are required. Due to the size and power output, these large-scale batteries generate a large amount of heat during rapid charge and discharge cycles at high current levels. Thus, batteries have to be thermally managed by cooling or dissipating heat to avoid battery malfunction and increase the life time of the battery.

Furthermore, the performance of the battery is temperature dependent. Depending on their type, batteries perform optimally only with a particular temperature range. Therefore, a proper thermal management allows optimizing battery performance.

Naser Ali et al. *Review article* (2018): "A review on nanofluids: fabrication, stability and thermophysical properties" relates to the development of nanofluids and points that stability of nanofluids is a very important element in commercializing nanofluids as it extends the shelf-life of the product while conserving its thermo-physical properties. It also indicates that a major drawback of using such type of fluids is the rise in pressure losses in piping systems caused from the increase in viscosity of nanofluids. In this document, mainly hydrophilic heat transfer fluids are described as state of the art.

WO 2018/019783 A1 discloses polymeric-inorganic nanoparticle compositions and processes for their preparation, as well as the use thereof in an oil lubricant formulation to reduce pour point, friction and wear. WO 2018/019783 A1 does not deal with heat transfer fluids.

US 2017/009120 A1 relates to ready to use heat transfer fluids and a method for preventing corrosion in heat transfer systems, wherein the heat transfer fluids comprise a freezing point depressant, water, or a combination thereof; a carboxylate; an inorganic phosphate; an azole compound; calcium ions and/or magnesium ions; and a water-soluble polymer, e.g. a water-soluble acrylate polymer.

Kikuo Okuyama et al. (Ind. Eng. Chem. Res. 2008, 47, 2597-2604) describes a polymeric-nanoparticle composite material, wherein the titanium oxide is present in the monomer mixture during polymerization and is embedded in the resulting polymethylmethacrylate (PMMA), leading to a solid $TiO_2$-PMMA composite material having improved UV light-absorbing properties WO 2019/107722 A1 discloses a heat-radiating fluid composition comprising (i) a non-conductive oil, (ii) thermally conductive inorganic particles which are selected from the group consisting of silica, alumina, aluminosilicate, aluminium nitride, silicon nitride and boron nitride, and (iii) an inorganic precipitation inhibitor selected from fumed silica, fumed alumina or aerogel. In order to maintain the inorganic nanoparticles well-dispersed in the heat transfer fluid, WO 2019/107722 A1 teaches to have a combination of a controlled viscosity of the heat-dissipation fluid, the use of an inorganic precipitation inhibitor and of thermally conductive inorganic particles which are heavier than the inorganic precipitation inhibitor.

WO 2014/106556 A1 discloses the use of poly alkyl (meth)acrylates as heat transfer fluids. The compositions in WO 2014/106556 A1 do not comprise any inorganic nanoparticles. The polymers do not comprise any functional monomer units.

WO 2013/115925 A1 discloses a nanocomposite fluid including a fluid medium and a nanoparticle composition comprising nanoparticles, which are electrically insulating and thermally conductive. The document does not give any concrete examples regarding the preparation of the nanocomposite fluids. No details are given regarding the stability of the nanocomposite fluids, nor does it show any comparison of viscosity and thermal conductivity with the corresponding reference base fluid.

However, creating a stable dispersion of nanoparticles is problematic. Most untreated inorganic nanoparticles, such as $TiO_2$ and $SiO_2$, are hydrophilic in nature and therefore form poor dispersions in oil or non-polar environments. Furthermore, the poor dispersion and weak forces of the particles draw particles together causing agglomeration. These agglomerates will lead to sedimentation that is unwanted and ineffective for the formulation.

Therefore, the present invention aims at providing a new method for heat transfer in electrical equipment having moving parts such as electric motors, electric vehicle transmissions, or in electrical equipment without any moving parts such as electric batteries, electric transformers, electric capacitors, fluid-filled transmission lines, fluid-filled power cables, computers or power electronics such as electric power converters. In general, hydrophobic dielectric fluids are preferred if direct contact with metal parts is possible, which gives electrical insulation, because they prevent electrical contact due to safety reasons. Thus, it is an object of this invention to provide improved heat transfer nanofluids with increased stability of nanoparticles in hydrophobic media. The heat transfer nanofluid should be stable over time and fulfills the standards of applications, such as an improved heat performance over a long period of time and at different temperatures when used in an electrical device.

SUMMARY

In the present invention, it was surprisingly found that a polymeric-inorganic nanoparticle composition comprising inorganic nanoparticles and polymers as defined in claim 1 can be used as a heat transfer fluid for batteries and other electrical equipment. The challenge was to combine great heat transfer performance, while maintaining the nanoparticles comprised in the heat transfer fluid well dispersed over a long period of time at high temperatures. The targeted use was achieved with the composition as defined in claim 1.

According to a first aspect, the present invention consequently relates to the use of a polymeric-inorganic nanoparticle composition as defined in claim 1 as a heat transfer fluid. The polymeric-inorganic nanoparticle compositions according to the invention are favorably used as a heat transfer fluid for electrical equipment such as electric batteries, electric motors, electric vehicle transmissions, electric transformers, electric capacitors, fluid-filled transmission lines, fluid-filled power cables, computers or power electronics such as electric power converters.

DETAILED DESCRIPTION

Thus, the present invention relates to the use of a polymeric-inorganic nanoparticle composition as a heat transfer fluid in battery or other electrical equipment systems, wherein the polymeric-inorganic nanoparticle composition is obtainable by milling a mixture, the mixture comprising one or more inorganic nanoparticle compound (A) and one or more polymer compound (B), (A) wherein the one or more inorganic nanoparticle compound is selected from the group consisting of metal or metalloid oxide nanoparticle, metal or metalloid nitride nanoparticle, metal or metalloid carbide nanoparticle, or a mixture thereof, and (B) wherein the one or more polymer compound is obtainable by polymerizing a monomer composition comprising:

a) 1 to 35% by weight, based on the total weight of the monomer composition, of one or more functional monomer selected from the list consisting of:

a1) aminoalkyl (meth)acrylates and aminoalkyl (meth)acrylamides like N-(3-dimethyl-aminopropyl)methacrylamide, 2-dimethylaminoethyl (meth)acrylate, 3-diethylaminopentyl (meth)acrylate, 3-dibutylaminohexadecyl (meth)acrylate;

a2) nitriles of alkyl (meth)acrylic acid and other nitrogen-containing alkyl (meth)acrylates like N-(methacryloyloxyethyl)diisobutylketimine, N-(methacryloyloxyethyl)dihexadecyl-ketimine, (meth)acryloylamidoacetonitrile, 2-meth acryloyl oxy ethyl methyl cyanamide, cyanomethyl (meth) acrylate;

a3) (meth)acrylates of ether alcohols like tetrahydrofurfuryl (meth)acrylate, methoxyethoxyethyl (meth)acrylate, 1-butoxypropyl (meth)acrylate, cyclohexyloxyethyl (meth)acrylate, propoxyethoxyethyl (meth)acrylate, benzyloxyethyl (meth)acrylate, furfuryl (meth)acrylate, 2-butoxyethyl (meth)acrylate, 2-ethoxy-2-ethoxyethyl (meth)acrylate, 2-methoxy-2-ethoxypropyl (meth) acrylate, ethoxylated (meth)acrylates, 1-ethoxybutyl (meth)acrylate, methoxyethyl (meth)acrylate, 2-ethoxy-2-ethoxy-2-ethoxyethyl (meth) acrylate, esters of (meth)acrylic acid and methoxy polyethylene glycols;

a4) oxiranyl alkyl (meth)acrylate like 2, 3-epoxybutyl (meth)acrylate, 3,4-epoxybutyl (meth)acrylate, 10,11 epoxyundecyl (meth)acrylate, 2,3-epoxycyclohexyl (meth)acrylate, 10,11-epoxyhexadecyl (meth)acrylate, glycidyl (meth) acrylate;

a5) phosphorus-, boron- and/or silicon-containing alkyl (meth)acrylates like 2-(dimethyl-phosphato) propyl (meth)acrylate, 2-(ethylphosphito)propyl (meth)acrylate, 2 dimethylphosphinomethyl (meth)acrylate, dimethylphosphonoethyl (meth) acrylate, diethylmethacryloyl phosphonate, dipropylmethacryloyl phosphate, 2 (dibutylphosphono) ethyl (meth)acrylate, 2,3-butylenemethacryloylethyl borate, methyldiethoxymethacryloylethoxysiliane, diethylphosphatoethyl (meth)acrylate, 3-(Trimethoxysilyl)propyl methacrylate; 3-(Triethoxysilyl)propyl methacrylate, 3-(Trichlorosilyl)propyl methacrylate;

a6) heterocyclic alkyl (meth)acrylates like 2-(1-imidazolyl)ethyl (meth)acrylate, 2-(4-morpholinyl) ethyl (meth)acrylate, oxazolidinylethyl (meth) acrylate and N-methacryloylmorpholine;

a7) vinyl halides like vinyl chloride, vinyl fluoride, vinylidene chloride and vinylidene fluoride;

a8) vinyl esters like vinyl acetate;

a9) vinyl monomers containing aromatic groups like styrene, substituted styrenes with an alkyl substituent in the side chain, such as alpha-methylstyrene and alpha-ethylstyrene, substituted styrenes with an alkyl substituent on the ring such as vinyltoluene and p-methylstyrene, halogenated styrenes such as monochlorostyrenes, dichlorostyrenes, tribromostyrenes and tetrabromostyrenes;

a10) heterocyclic vinyl compounds like 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

a11) vinyl and isoprenyl ethers;

a12) methacrylic acid and acrylic acid, b) 65 to 99% by weight of one or more alkyl (meth) acrylate monomer, wherein each of the alkyl group of the one or more alkyl (meth)acrylate monomer is independently linear, cyclic or branched and comprises from 1 to 40 carbon atoms, based on the total weight of the monomer composition, and wherein the weight ratio of the one or more inorganic nanoparticle compound (A) to the one or more polymer compound (B) is 9:1 to 1:5.

According to a preferred embodiment, the weight ratio of the one or more inorganic nanoparticle compound (A) to the one or more polymer compound (B) is preferably 9:1 to 1:2, more preferably 5:1 to 1:1, most preferably 3:1 to 1:1.

According to another preferred embodiment, the amounts of a) and b) sum up to 100% by weight, based on the total weight of the monomer composition.

"One or more" as used herein means that at least one, or more than one, of the recited components maybe be used as disclosed.

"Other electrical equipment systems" as used herein means electrical equipment such as electric batteries, electric motors, electric vehicle transmissions, electric transformers, electric capacitors, fluid-filled transmission lines, fluid-filled power cables, computers or power electronics such as electric power converters.

The use defined above also means a method for enhancing the heat transfer and thermal conductivity in a heat transfer fluid used in battery or other electrical equipment systems, wherein the polymeric-inorganic nanoparticle composition is obtainable by milling a mixture, the mixture comprising one or more inorganic nanoparticle compound (A) and one or more polymer compound (B), as defined above and throughout the description and in claims 1 to 15.

The heat transfer nanofluids according to the invention show increased stability of nanoparticles in hydrophobic media as demonstrated in the experimental part of the present document.

According to the invention, it is preferred that the heat transfer fluid further comprises a base fluid (C), which has a kinematic viscosity at 40° C. from 3 cSt to 30 cSt, more preferably from 3 cSt to 25 cSt, according to ASTM D-445 and a flash point higher than 110° C. according to ASTM D-93.

Advantageously it has been observed that the nanoparticle compositions used as a heat transfer fluid in battery or other electrical equipment systems having metal moving parts do not only enhance heat transfer and thermal conductivity, but also provide good tribological properties. The fluid can also be used as lubricant with good tribological properties needed in e.g. electric vehicle transmissions, but also in classical internal combustion engine transmissions, in particular manual transmission, automated manual transmission, automatic transmissions, continuously variable transmission and dual clutch transmission in light-duty and heavy-duty applications. The additional good tribological properties comprises high load capacity, while not corroding copper, which is surprising and currently not achieved by using state-of-the art chemistry. These two properties are contradicting to each other using the current state-of-the art chemistry, because for a high load capacity sulfur containing additives are necessary, while those sulfur containing additives lead to increased corrosion of copper by building copper sulfide. Avoiding copper corrosion is a requirement, especially for EV applications, where direct contacts of the fluid with copper wires, circuit boards and electric connectors happen. With the composition of the present invention, it is possible to enhance the load capacity without using components that lead to copper corrosion. The experimental part illustrates these additional beneficial effects on load capacity while avoiding copper corrosion.

Thus, in a preferred embodiment when the nanoparticle compositions used as a heat transfer fluid in battery or other electrical equipment systems have metal moving parts, the invention relates to a method for enhancing the heat transfer and thermal conductivity, and for improving high load capacity while avoiding copper corrosion in a heat transfer fluid used in battery or other electrical equipment systems having metal moving parts.

Inorganic Nanoparticle Compounds (A)

According to the present invention, the inorganic nanoparticle compound (also referred to as "particle" or "nanoparticle" in the present text) is a microscopic particle with at least one dimension being between 1 and 500 nm, preferably between 2 and 250 nm and more preferably between 5 and 100 nm (determined using transmission electron microscopy, TEM). This particle can either be of individual character or be present in an aggregated and/or agglomerated structure. In the latter, the size of the primary particle is between the aforementioned sizes in at least one dimension. The size of the aggregated/agglomerated structure can be between 50 and 100,000 nm, preferably between 100 and 10,000 nm and more preferably between 100 to 3,000 nm (determined using static light scattering technique, d50 SLS).

All above dimensions are provided for illustrative purposes only and are not intended to limit the present disclosure.

According to a preferred aspect of the present invention, the inorganic nanoparticle is an oxide, nitride or carbide of silicon, cerium, titanium, aluminum, copper, calcium, magnesium, iron, zinc. Preferred metal or metalloid oxide nanoparticles are $SiO_2$, $CeO_2$, $TiO_2$, $Al_2O_3$, CuO, CaO, MgO, $Fe_2O_3$, $Fe_3O_4$, ZnO, or a mixture thereof. More preferably, the inorganic nanoparticle is $TiO_2$ or $Al_2O_3$.

According to another preferred aspect of the present invention, the inorganic nanoparticle is selected from nitrides of boron or aluminum, preferably hBN or AlN.

According to a preferred aspect of the present invention, the nanoparticle is selected from a mixture of above-mentioned structures.

According to another preferred aspect of the present invention, the nanoparticle is selected from $TiO_2$, $Al_2O_3$ or a mixture thereof.

Polymer (B)

The polymer of the invention is not a crystalline or semi-crystalline polymer but is an amorphous polymer.

In a preferred embodiment of the invention, the one or more polymer compound (B) has a number-average molecular weight ($M_n$) of 2,000 to 150,000 g/mol, more preferably 5,000 to 100,000 g/mol, even more preferably 5,000 to 80,000 g/mol.

In the present invention, the number-average molecular weights of the polymers were determined by gel permeation chromatography (GPC) using polymethylmethacrylate (PMMA) calibration standards and tetrahydrofuran (THF) as eluent (flow rate: 1 mL/min; injected volume: 100 μL).

Preferably, the one or more polymer compound (B), prepared with a monomer composition comprising the monomer components a) and b), is obtainable by polymerizing a monomer composition comprising:

a) 1 to 30% by weight, more preferably 4 to 30% by weight of the one or more functional monomer as component a), based on the total weight of the monomer composition; and b) 70 to 99% by weight, more preferably 70 to 96% by weight of the one or more alkyl (meth)acrylate monomer wherein each of the alkyl group of the one or more alkyl (meth)acrylate monomer independently is linear, cyclic or branched and comprises from 1 to 40 carbon atoms, based on the total weight of the monomer composition.

In a preferred embodiment, the weight contents of monomers a) and b) of the monomer composition sum up to 100% by weight, based on the total weight of the monomer composition.

Functional Monomer a)

As already defined above, the one or more functional monomer a) according to the present invention are selected from the list consisting of:

a1) aminoalkyl (meth)acrylates and aminoalkyl (meth) acrylamides;

a2) nitriles of alkyl (meth)acrylic acid and other nitrogen-containing alkyl (meth)acrylates;

a3) (meth)acrylates of ether alcohols;

a4) oxiranyl alkyl (meth)acrylate;

a5) phosphorus-, boron- and/or silicon-containing alkyl (meth)acrylates;

a6) heterocyclic alkyl (meth)acrylates;

a7) vinyl halides;

a8) vinyl esters;

a9) vinyl monomers containing aromatic groups;

a10) heterocyclic vinyl compounds;

a11) vinyl and isoprenyl ethers;

a12) methacrylic acid and acrylic acid.

Preferably, the functional monomer a) is selected from an aminoalkyl (meth)acrylate a1) or an aminoalkyl (meth) acrylamide a1) or a silicon-containing alkyl (meth)acrylate a5) or a heterocyclic alkyl (meth)acrylate a6). More preferably from an aminoalkyl (meth)acrylate a1) or an aminoalkyl (meth)acrylamide a1) or a heterocyclic alkyl (meth) acrylate a6).

Even more preferably, the functional monomer a) is selected from N-(3-dimethyl-aminopropyl)methacrylamide, 2-dimethylaminoethyl (meth)acrylate, 3-(Trimethoxysilyl) propyl methacrylate; 3-(Triethoxysilyl)propyl methacrylate, or oxazolidinylethyl (meth)acrylate. Most preferably from N-(3-dimethyl-aminopropyl)methacrylamide, 2-dimethylaminoethyl (meth)acrylate, or oxazolidinylethyl (meth)acrylate.

Alkyl (Meth)Acrylate Monomer b)

The term "(meth)acrylic acid" refers to acrylic acid, methacrylic acid and mixtures of acrylic acid and methacrylic acid; methacrylic acid being preferred. The term "(meth)acrylate" refers to esters of acrylic acid, esters of methacrylic acid or mixtures of esters of acrylic acid and methacrylic acid; esters of methacrylic acid being preferred.

The term "$C_{1-40}$ alkyl (meth)acrylates" refers to esters of (meth)acrylic acid and straight chain, cyclic or branched alcohols having 1 to 40 carbon atoms. The term encompasses individual (meth)acrylic esters with an alcohol of a particular length, and likewise mixtures of (meth)acrylic esters with alcohols of different lengths.

According to the invention it is preferred that in optional component b) of the polymeric-inorganic nanoparticle composition each of the alkyl group of the one or more alkyl (meth)acrylate monomer independently is linear, cyclic or branched and comprises from 1 to 40 carbon atoms.

According to the invention, it is preferred that the one or more alkyl (meth)acrylate monomer b) comprises:

b1) one or more alkyl (meth)acrylate of formula (I):

(I)

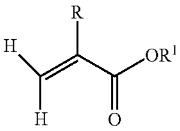

wherein R is hydrogen or methyl, $R^1$ means a linear, branched or cyclic alkyl residue with 1 to 8 carbon atoms, preferably 1 to 5 carbon atoms, and more preferably 1 to 4 carbon atoms, based on the total weight of the monomer composition, b2) one or more alkyl (meth)acrylate of formula (II):

(II)

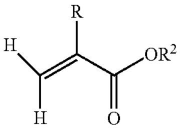

wherein R is hydrogen or methyl, $R^1$ means a linear, branched or cyclic alkyl residue with 9 to 15 carbon atoms, preferably 12 to 15 carbon atoms, b3) one or more alkyl (meth)acrylate of formula (III):

(III)

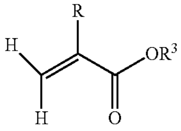

wherein R is hydrogen or methyl, $R^3$ means a linear, branched or cyclic alkyl residue with 16 to 40 carbon atoms, preferably 16 to 30 carbon atoms, and more preferably 16 to 22 carbon atoms.

The term "$C_{1-8}$ alkyl (meth)acrylates" refers to esters of (meth)acrylic acid and straight chain or branched alcohols having 1 to 8 carbon atoms. The term encompasses individual (meth)acrylic esters with an alcohol of a particular length, and likewise mixtures of (meth)acrylic esters with alcohols of different lengths.

According to the invention each of the one or more monomer according to formula (I), i.e. the $C_{1-8}$ alkyl (meth) acrylates, may independently be selected from the group consisting of (meth)acrylates derived from saturated alcohols, preferably methyl (meth)acrylate, ethyl (meth)acrylate, n-propyl (meth)acrylate, isopropyl (meth)acrylate, n-butyl (meth)acrylate, tert-butyl (meth)acrylate, pentyl (meth)acrylate, hexyl (meth)acrylate, cycloalkyl (meth)acrylates, cyclopentyl (meth)acrylate, cyclohexyl (meth)acrylate, 2-ethylhexyl (meth)acrylate, heptyl (meth)acrylate, 2-tert-butylheptyl (meth)acrylate, n-octyl (meth)acrylate and 3-isopropylheptyl (meth)acrylate, the most preferred monomer according to formula (II) is methyl methacrylate.

Particularly preferred $C_{1-8}$ alkyl (meth)acrylates are methyl (meth)acrylate and n-butyl (meth)acrylate; methyl methacrylate and n-butyl methacrylate are especially preferred.

The term "$C_{9-15}$ alkyl (meth)acrylates" refers to esters of (meth)acrylic acid and straight chain or branched alcohols having 9 to 15 carbon atoms. The term encompasses individual (meth)acrylic esters with an alcohol of a particular length, and likewise mixtures of (meth)acrylic esters with alcohols of different lengths.

According to the invention each of the one or more monomer according to formula (II), i.e. the $C_{9-15}$ alkyl (meth)acrylates, may also independently be selected from the group consisting of nonyl (meth)acrylate, decyl (meth) acrylate, isodecyl (meth)acrylate, undecyl (meth)acrylate, 5-methylundecyl (meth)acrylate, n-dodecyl (meth)acrylate, 2-methyldodecyl (meth)acrylate, tridecyl (meth)acrylate, 5-methyltridecyl (meth)acrylate, n-tetradecyl (meth)acrylate, pentadecyl (meth)acrylate, oleyl (meth)acrylate, cycloalkyl (meth)acrylates, cyclohexyl (meth)acrylate having a ring substituent, tert-butylcyclohexyl (meth)acrylate, trimethylcyclohexyl (meth)acrylate, bornyl (meth)acrylate and isobornyl (meth)acrylate.

Particularly preferred $C_{9-15}$ alkyl (meth)acrylates are (meth)acrylic esters of a linear $C_{12-14}$ alcohol mixture ($C_{12-14}$ alkyl (meth)acrylate—lauryl methacrylate—LMA) or (meth)acrylic esters of a linear $C_{12-15}$ alcohol mixture ($C_{12-15}$ alkyl (meth)acrylate—dodecyl pentadecyl methacrylate—DPMA).

The term "$C_{16-40}$ alkyl (meth)acrylates" refers to esters of (meth)acrylic acid and straight chain or branched alcohols having 16 to 40 carbon atoms. The term encompasses individual (meth)acrylic esters with an alcohol of a particular length, and likewise mixtures of (meth)acrylic esters with alcohols of different lengths.

According to the invention each of the one or more monomer according to formula (III), i.e. the $C_{16-40}$ alkyl (meth)acrylates, may also independently be selected from the group consisting of hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate, behenyl (meth)acrylate, eicosyltetratriacontyl (meth)acrylate, cycloalkyl (meth)acrylates, 2,4,5-tri-t-butyl-3-vinylcyclohexyl (meth)acrylate, and 2,3,4,5-tetra-t-butylcyclohexyl (meth)acrylate.

Preferable Monomer Compositions

According to a preferred embodiment of the invention, it is preferred that the one or more polymer compound (B) is obtainable by polymerizing a monomer composition comprising:

a) 1 to 35% by weight, more preferably 1 to 30% by weight, even more preferably 4 to 30% by weight of the one or more functional monomer as component a), based on the total weight of the monomer composition; and b1) 0 to 20% by weight, more preferably 0 to 15% by weight, of the one or more alkyl (meth)acrylate monomer of formula (I), as first component b), wherein each of the alkyl group of the one or more alkyl (meth) acrylate monomer independently is linear, cyclic or branched and comprises from 1 to 8 carbon atoms, preferably 1 to 5 carbon atoms, and more preferably 1 to 4 carbon atoms, based on the total weight of the monomer composition; and b2) 45 to 99% by weight, more preferably 50 to 96% by weight, of the one or more alkyl (meth)acrylate monomer of formula (II), as second component b), wherein each of the alkyl group of the one or more alkyl (meth)acrylate monomer independently is linear, cyclic or branched and comprises from 9 to 15 carbon atoms, preferably 12 to 15 carbon atoms, based on the total weight of the monomer composition; and b3) 0 to 30% by weight, more preferably 0 to 20% by weight, of the one or more alkyl (meth)acrylate monomer of formula (III), as third component b), wherein each of the alkyl group of the one or more alkyl (meth)acrylate monomer independently is linear, cyclic or branched and comprises from 16 to 40 carbon atoms, preferably 16 to 30 carbon atoms, and more preferably 16 to 22 carbon atoms, based on the total weight of the monomer composition;

wherein the amount of all monomers of the monomer composition sum up to 100% by weight.

According to another preferred embodiment of the invention, it is preferred that the one or more polymer compound (B), as defined in claim 1, is obtainable by polymerizing a monomer composition comprising:

a) 1 to 35% by weight, more preferably 1 to 30% by weight, even more preferably 4 to 30% by weight of an aminoalkyl (meth)acrylate a1) or an aminoalkyl (meth) acrylamide a1) or a silicon-containing alkyl (meth) acrylate a5) or a heterocyclic alkyl (meth)acrylate a6), as component a), based on the total weight of the monomer composition; and b1) 0 to 20% by weight of the one or more alkyl (meth)acrylate monomer of formula (I), as first component b), wherein each of the alkyl group of the one or more alkyl (meth)acrylate monomer independently is linear, cyclic or branched and comprises from 1 to 8 carbon atoms, preferably 1 to 5 carbon atoms, and more preferably 1 to 4 carbon atoms, based on the total weight of the monomer composition; and b2) 45 to 99% by weight, more preferably 50 to 96% by weight, of the one or more alkyl (meth)acrylate monomer of formula (II), as second component b), wherein each of the alkyl group of the one or more alkyl (meth)acrylate monomer independently is linear, cyclic or branched and comprises from 9 to 15 carbon atoms, preferably 12 to 15 carbon atoms, based on the total weight of the monomer composition; and b3) 0 to 30% by weight, more preferably 0 to 20% by weight, of the one or more alkyl (meth)acrylate monomer of formula (III), as third component b), wherein each of the alkyl group of the one or more alkyl (meth)acrylate monomer independently is linear, cyclic or branched and comprises from 16 to 40 carbon atoms, preferably 16 to 30 carbon atoms, and more preferably 16 to 22 carbon atoms, based on the total weight of the monomer composition;

wherein the amount of all monomers of the monomer composition sum up to 100% by weight.

In another particularly preferred embodiment of the invention, the one or more polymer compound (B) is obtainable by polymerizing a monomer composition comprising:

a1) 1 to 10% by weight, more preferably 1 to 5% by weight of an aminoalkyl (meth)acrylamide, most preferably N-(3-dimethyl-aminopropyl)methacrylamide, as component a), based on the total weight of the monomer composition; and b1) 0 to 15% by weight, more preferably 0 to 10% by weight of an alkyl (meth)acrylate monomer of formula (I), most preferably methyl methacrylate, as first component b), based on the total weight of the monomer composition; and b2) 80 to 99% by weight, more preferably 90 to 99% by weight of an alkyl (meth)acrylate monomer of formula (II), most preferably lauryl methacrylate or dodecyl pentadecyl methacrylate, as second component b), based on the total weight of the monomer composition;

wherein the amount of all monomers of the monomer composition sum up to 100% by weight.

In another particularly preferred embodiment of the invention, the one or more polymer compound (B) is obtainable by polymerizing a monomer composition comprising:

a1) 10 to 35% by weight, more preferably 20 to 35% by weight of an aminoalkyl (meth)acrylate, most preferably 2-dimethylaminoethyl (meth)acrylate, as component a), based on the total weight of the monomer composition; and b1) 0 to 10% by weight, more preferably 0 to 5% by weight of an alkyl (meth)acrylate monomer of formula (I), most preferably methyl methacrylate and/or butyl methacrylate, as first component b), based on the total weight of the monomer composition; and b2) 45 to 80% by weight, more preferably 45 to 55% by weight of an alkyl (meth)acrylate monomer of formula (II), most preferably lauryl methacrylate or dodecyl pentadecyl methacrylate, as second component b), based on the total weight of the monomer composition;

b3) 10 to 30% by weight, more preferably 10 to 20% by weight of an alkyl (meth)acrylate monomer of formula (III), most preferably stearyleicosyl methacrylate, as third component b), based on the total weight of the monomer composition;

wherein the amount of all monomers of the monomer composition sum up to 100% by weight.

In another particularly preferred embodiment of the invention, the one or more polymer compound (B) is obtainable by polymerizing a monomer composition comprising:

a5) 1 to 20% by weight, more preferably 5 to 15% by weight of a silicon-containing alkyl (meth)acrylate, most preferably 3-(Trimethoxysilyl)propyl methacrylate, as component a), based on the total weight of the monomer composition; and b2) 80 to 99% by weight, more preferably 85 to 95% by weight of an alkyl (meth)acrylate monomer of formula (II), most preferably lauryl methacrylate, as second component b), based on the total weight of the monomer composition;

wherein the amount of all monomers of the monomer composition sum up to 100% by weight.

In another particularly preferred embodiment of the invention the one or more polymer compound (B) is obtainable by polymerizing a monomer composition comprising:

a6) 1 to 15% by weight, more preferably 1 to 10% by weight of heterocyclic (meth)acrylates, most preferably oxazolidinylethyl (meth)acrylate, as component a), based on the total weight of the monomer composition; and b1) 0 to 20% by weight, more preferably 10 to 20% by weight of an alkyl (meth)acrylate monomer of formula (I), most preferably methyl methacrylate, as first component b), based on the total weight of the monomer composition; and b2) 65 to 99% by weight, more preferably 70 to 89% by weight of an alkyl (meth)acrylate monomer of formula (II), most preferably lauryl methacrylate, as second component b), based on the total weight of the monomer composition;

wherein the amount of all monomers of the monomer composition sum up to 100% by weight.

Preparation of the Polymer Compound (B)

According to the present invention, the above-mentioned polymers may be prepared following the method comprising the steps of:

(x) providing a monomer composition as describe above; and (y) initiating radical polymerization in the monomer composition.

Standard free-radical polymerization is detailed, inter alia, in Ullmann's Encyclopedia of Industrial Chemistry, Sixth Edition. In general, a polymerization initiator and optionally a chain transfer agent are used for this purpose.

The polymerization can be conducted under standard pressure, reduced pressure or elevated pressure. The polymerization temperature is also uncritical. In general, however, it is in the range from −20 to 200° C., preferably 50 to 150° C. and more preferably 80 to 130° C.

The polymerization step (y) may be performed with or without dilution in oil. If dilution is performed, then the amount of the monomer composition, i.e. the total amount of monomers, relative to the total weight of the reaction mixture is preferably 20 to 90% by weight, more preferably 40 to 80% by weight, most preferably 50 to 70% by weight.

Preferably, the oil used for diluting the monomer mixture is an API Group I, II, III, IV or V oil, or a mixture thereof. Preferably, a Group III oil or a mixture thereof is used to dilute the monomer mixture.

Preferably, step (y) comprises the addition of a radical initiator.

Suitable radical initiators are, for example, azo initiators, such as azobis-isobutyronitrile (AIBN), 2,2'-azobis(2-methylbutyronitrile) (AMBN) and 1,1-azobiscyclohexanecarbonitrile, and peroxy compounds such as methyl ethyl ketone peroxide, acetylacetone peroxide, dilauryl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, tert-butylperoxypivalate and bis(4-tert-butylcyclohexyl) peroxydicarbonate.

Preferably, the radical initiator is selected from the group consisting of 2,2'-azobis(2-methylbutyronitrile), 2,2-bis (tert-butylperoxy)butane, tert-butylperoxy 2-ethylhexanoate, 1,1-di-tert-butylperoxy-3,3,5-trimethylcyclohexan, tert-butyl peroctoate, tert-butyl peroxybenzoate, tert-butylperoxypivalate and tert-butylperoxy-3,5,5-trimethylhexanoat. Particularly preferred initiators are tert-butylperoxy 2-ethylhexanoate, tert-butyl peroctoate and tert-butylperoxypivalate.

Preferably, the total amount of radical initiator relative to the total weight of the monomer mixture is 0.01 to 5% by weight, more preferably 0.1 to 3% by weight, most preferably 0.1 to 2% by weight.

The total amount of radical initiator may be added in a single step or the radical initiator may be added in several steps over the course of the polymerization reaction. Preferably, the radical initiator is added in several steps. For example, a part of the radical initiator may be added to initiate radical polymerization and a second part of the radical initiator may be added 0.5 to 3.5 hours after the initial dosage.

Preferably, step (y) also comprises the addition of a chain transfer agent. Suitable chain transfer agents are especially oil-soluble mercaptans, for example n-dodecyl mercaptan, 2-Ethylhexylthioglycolate or 2-mercaptoethanol, or else chain transfer agents from the class of the terpenes, for example terpinolene. Particularly preferred is the addition of n-dodecyl mercaptan and 2-Ethylhexylthioglycolate.

It is also possible to divide the monomer composition into an initial part and a second part and to add a part of the radical initiator to the initial part only to start the polymerization reaction therein. Then, the second part of the radical initiator is added to the second part of the monomer composition which is then added over the course of 0.5 to 5 hours, preferably 1.5 to 4 hours, more preferably 2 to 3.5 hours, to the polymerization reaction mixture. After addition of the second monomer mixture, a third part of the radical initiator may be added to the polymerization reaction as described above.

Preferably, the total reaction time of the radical polymerization is 2 to 10 hours, more preferably 3 to 9 hours.

After completion of the radical polymerization, the obtained polymer is preferably further diluted with the above-mentioned oil to the desired viscosity. Preferably, the polymer is diluted to a concentration of 5 to 60% by weight polymer, more preferably 10 to 50% by weight, most preferably 20 to 40% by weight.

The Polymeric-Inorganic Nanoparticle Composition of the Invention

According to a preferred embodiment of the invention, the polymeric-inorganic nanoparticle composition comprising the one or more nanoparticle (A) and the one or more polymer compound (B) as defined herein may further comprises a base fluid (C), which has a kinematic viscosity at 40° C. from 3 cSt to 30 cSt, more preferably from 3 cSt to 25 cSt, according to ASTM D-445 and a flash point higher than 110° C. according to ASTM D-93.

The base fluid (C) can be a base oil, selected from the list consisting of an API Group I base oil, an API Group II base oil, an API Group III, an API Group IV base oil and an API Group V base oil or a combination thereof.

The base oil may also be defined as specified by the American Petroleum Institute (API) (see April 2008 version of "Appendix E-API Base Oil Interchangeability Guidelines for Passenger Car Motor Oils and Diesel Engine Oils", section 1.3 Sub-heading 1.3. "Base Stock Categories").

The API currently defines five groups of lubricant base stocks (API 1509, Annex E—API Base Oil Interchangeability Guidelines for Passenger Car Motor Oils and Diesel Engine Oils, September 2011). Groups I, II and Ill are mineral oils which are classified by the amount of saturates and sulphur they contain and by their viscosity indices; Group IV are polyalphaolefins; and Group V are all others, including e.g. ester oils. The table below illustrates these API classifications.

TABLE 1

API definition of lubricant base stocks

| Group | Saturates | Sulphur content | Viscosity Index (VI) |
|---|---|---|---|
| I | <90% | >0.03% | 80-120 |
| II | at least 90% | not more than 0.03% | 80-120 |
| III | at least 90% | not more than 0.03% | at least 120 |
| IV | All polyalphaolefins (PAOs) | | |
| V | All others not included in Groups I, II, III or IV (e.g. ester oils) | | |

In a preferred embodiment, the base fluid (C) with a kinematic viscosity at 40° C. from 3 cSt to 30 cSt, more preferably from 3 cSt to 25 cSt, according to ASTM D-445 and a flash point higher than 110° C. according to ASTM D-93 is selected from polyalphaolefin, tetrabutane, API Group III base oil or a mixture thereof, preferably, tetrabutane or API Group III base oil, or a mixture thereof.

The base fluid (C) can be a fluorinated compound, such as polyhexafluoropropylene oxide, perfluroropolyether (PFPE), perfluoroalkylether (PFAE), perfluoropolyalkylether (PFPAE), a hydrofluorether, or a mixture thereof.

If the base fluid (C) is selected from API group V base oil, it is preferably selected from the group consisting of a silicone oils, naphthenes, polyalkylene glycols, synthetic oils including liquid esters of phosphorus containing acids, or a mixture thereof.

The base fluid (C) can also be a mixture of any base oils listed above.

It is preferred that the nanoparticle composition for use as a heat transfer fluid comprises 80 to 99.9% by weight of a base fluid (C) and 0.1 to 20% by weight of (A) and (B), more preferably 85 to 99.9% by weight of a base fluid (C) and 0.1 to 15% by weight of (A) and (B), most preferably 88 to 99.5% by weight of a base fluid (C) and 0.5 to 12% by weight of (A) and (B), based on the total weight of the polymeric-inorganic nanoparticle composition. In another preferred embodiment, the amounts of (A), (B) and (C) sum up to 100% by weight, based on the total weight of the polymeric-inorganic nanoparticle composition.

In a preferred embodiment of the method for manufacturing the polymeric-inorganic nanoparticle composition, the mixture of one or more inorganic nanoparticle (A), the one or more polymer compound (B) and optionally the base fluid (C) is milled using an ultrasound equipment having between 10 to 1000 W, preferably 50 to 800 W and more preferably 100 to 500 W power. Preferably, the composition is milled for 1 to 240 minutes, more preferably for 10 to 180 minutes and even more preferably for 30 to 150 minutes to achieve a stable polymeric-inorganic nanoparticle composition.

In another preferred embodiment, the mixture of one or more inorganic nanoparticle (A), the one or more polymer compound (B) and optionally the base fluid (C) is milled using ultrahigh-pressure technology (e.g. jet mill equipment Sugino Ultimaizer HJP-25050). At least two flows of this mixture are sprayed by means of pumps, preferably high-pressure pumps, through one nozzle (0.25 mm diameter) each into a grinding chamber enclosed by a reactor housing onto a collision point, characterized in that the grinding chamber is flooded with the mixture and the finally milled mixture is removed from the grinding chamber by the overpressure of the continuous flow into the grinding chamber. The pump pressure is between 100 to 4000 bar, preferably between 400 to 3000 bar, more preferably between 1000 to 2500 bar.

According to another preferred embodiment, the polymeric-inorganic nanoparticle composition comprising one or more inorganic nanoparticle (A), one or more polymer compound (B) and optionally the base fluid (C) is milled via a ball mill process. Preferably, the ball mill process comprises introducing 0.1 to 10 kWh/kg, preferably 1 to 5 kWh/kg, more preferably 1.5 to 3 kWh/kg energy into the mixture.

In another preferred embodiment, the method for manufacturing a polymeric-inorganic nanoparticle composition, especially a polymeric-inorganic nanoparticle composition as described above comprises the steps of:

(i) providing one or more inorganic nanoparticle compound (A) as defined herein;

(ii) providing one or more polymer compound (B) as defined herein;

(iii) preferably, providing a base fluid (C) as defined herein;

(iv) combining at least the one or more inorganic nanoparticle compound (A) and the one or more polymer compound (B) to obtain a mixture, preferably combining at least the one or more inorganic nanoparticle compound (A), the one or more polymer compound (B) and the base fluid (C) to obtain a mixture; and (v) milling the mixture.

According to this invention, the milling step (v) is defined by a resulting change of particle size distribution of the polymeric-inorganic nanoparticle composition measured using dynamic light scattering technology (DLS).

The milling technology according to the invention described in step (v) can be dissolver, rotor-stator equipment, homogenization, high pressure homogenization, high shear mixing, ultrasonic sound, ball milling or ultrahigh-pressure technology (jet mill) or a combination thereof. Indeed, the particle size of the agglomerates is reduced using these milling technologies.

The most preferred embodiment is milling the mixture via ultrahigh pressure technology (jet mill).

The heat transfer fluid according to the invention may also contain, as component (D), further additives selected from the group consisting of dispersants, defoaming agents, seal fix or seal compatibility agents, detergents, antioxidants, metal passivators, rust inhibitors, electrostatic discharge depressants, demulsifiers, emulsifiers, pour point depressants, anti-wear additives, extreme pressure additives, corrosion inhibitor, friction modifiers, dyes and mixtures thereof, as discussed below.

Appropriate dispersants include poly(isobutylene) derivatives, for example poly(isobutylene)succinimides (PIBSIs), including borated PIBSIs; and ethylene-propylene oligomers having N/O functionalities.

Dispersants (including borated dispersants) are preferably used in an amount of 0 to 10% by weight, based on the total weight of the polymeric-inorganic nanoparticle composition.

Suitable defoaming agents are silicone oils, fluorosilicone oils or fluoroalkyl ethers.

The defoaming agent is preferably used in an amount of 0.005 to 0.5% by weight, based on the total weight of the polymeric-inorganic nanoparticle composition.

The preferred detergents include metal-containing compounds, for example phenoxides; salicylates; thiophosphonates, especially thiopyrophosphonates, thiophosphonates and phosphonates; sulfonates and carbonates. As metal, these compounds may contain especially calcium, magnesium and barium. These compounds may preferably be used in neutral or overbased form.

Detergents are preferably used in an amount of 0.2 to 5% by weight, based on the total weight of the polymeric-inorganic nanoparticle composition.

The suitable antioxidants include, for example, phenol-based antioxidants and amine-based antioxidants.

Phenol-based antioxidants include, for example, octadecyl-3-(3,5-di-tert-butyl-4-hydroxyphenyl)propionate; 4,4'-methylenebis(2,6-di-tert-butylphenol); 4,4'-bis(2,6-di-t-butylphenol); 4,4'-bis(2-methyl-6-t-butylphenol); 2,2'-methylenebis(4-ethyl-6-t-butylphenol); 2,2'-methylenebis(4-methyl-6-t-butyl phenol); 4,4'-butyl idenebis(3-methyl-6-t-butylphenol); 4,4'-isopropylidenebis(2,6-di-t-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-t-butyl-4-methylphenol; 2,6-di-t-butyl-4-ethyl-phenol; 2,4-dimethyl-6-t-butylphenol; 2,6-di-t-amyl-p-cresol; 2,6-di-t-butyi-4-(N,N'-dimethylaminomethylphenol); 4,4'-thiobis(2-methyl-6-t-butylphenol); 4,4'-thiobis(3-methyl-6-t-butylphenol); 2,2'-thiobis(4-methyl-6-t-butylphenol); bis(3-methyl-4-hydroxy-5-t-butylbenzyl) sulfide; bis(3,5-di-t-butyl-4-hydroxybenzyl) sulfide; n-octyl-3-(4-hydroxy-3,5-di-t-butylphenyl)propionate; n-octadecyl-3-(4-hydroxy-3,5-di-t-butylphenyl)propionate; 2,2'-thio[diethyl-bis-3-(3,5-di-t-butyl-4-hydroxyphenyl)propionate]. Of those, especially preferred are bis-phenol-based antioxidants and ester group containing phenol-based antioxidants.

The amine-based antioxidants include, for example, monoalkyldiphenylamines such as monooctyldiphenylamine, monononyldiphenylamine; dialkyldiphenylamines such as 4,4'-dibutyldiphenylamine, 4,4'-dipentyldiphe nylamine, 4,4'-dihexyldiphenylamine, 4,4'-diheptyldiphenylamine, 4,4'-dioctyldiphenylamine, 4,4'-dinonyldiphenylamine; polyalkyldiphenylamines such as tetrabutyldiphenylamine, tetrahexyldiphenylamine, tetraoctyldiphenylamine, tetranonyldiphenylamine; naphthylamines, concretely alpha-naphthylamine, phenyl-alpha-naphthylamine and further alkyl-substituted phenyl-alpha-naphthylamines such as butylphenyl-alpha-naphthylamine, pentylphenyl-alpha-naphthylamine, hexylphenyl-alpha-naphthylamine, heptylphenyl-alpha-naphthylamine, octylphenyl-alpha-naphthylamine, nonylphenyl-alpha-naphthylamine. Of those, diphenylamines are preferred to naphthylamines, from the viewpoint of the antioxidation effect thereof.

Suitable antioxidants may further be selected from the group consisting of compounds containing sulfur and phosphorus, for example metal dithiophosphates, for example zinc dithiophosphates (ZnDTPs), "OOS triesters"=reaction products of dithiophosphoric acid with activated double bonds from olefins, cyclopentadiene, norbornadiene, α-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc bis(dialkyldithiocarbamate) and methylene bis(dialkyldithiocarbamate); organophosphorus compounds, for example triaryl and trialkyl phosphites; organocopper compounds and overbased calcium- and magnesium-based phenoxides and salicylates.

Antioxidants are used in an amount of 0 to 15% by weight, preferably 0.1 to 10% by weight, more preferably 0.2 to 5% by weight, based on the total weight of the polymeric-inorganic nanoparticle composition.

The pour-point depressants include ethylene-vinyl acetate copolymers, chlorinated paraffin-naphthalene condensates, chlorinated paraffin-phenol condensates, polymethacrylates, polyalkylstyrenes. Preferred are polymethacrylates having a weight-average molecular weight ($M_w$) of from 5,000 to 200,000 g/mol.

The amount of the pour point depressant is preferably from 0.1 to 5% by weight, based on the total weight of the polymeric-inorganic nanoparticle composition.

The preferred antiwear and extreme pressure additives include sulfur-containing compounds such as zinc dithiophosphate, zinc di-$C_{3-12}$-alkyldithiophosphates (ZnDTPs), zinc phosphate, zinc dithiocarbamate, molybdenum dithiocarbamate, molybdenum dithiophosphate, disulfides, sulfurized olefins, sulfurized oils and fats, sulfurized esters, thiocarbonates, thiocarbamates, polysulfides; phosphorus-containing compounds such as phosphites, phosphates, for example trialkyl phosphates, triaryl phosphates, e.g. tricresyl phosphate, amine-neutralized mono- and dialkyl phosphates, ethoxylated mono- and dialkyl phosphates, phosphonates, phosphines, amine salts or metal salts of those compounds; sulfur and phosphorus-containing anti-wear agents such as thiophosphites, thiophosphates, thiophosphonates, amine salts or metal salts of those compounds.

The antiwear agent may be present in an amount of 0 to 3% by weight, preferably 0.1 to 2% by weight, based on the total weight of the polymeric-inorganic nanoparticle composition.

The preferred friction modifiers may include mechanically active compounds, for example molybdenum disulphide, graphite (including fluorinated graphite), poly (trifluorethylene), polyamide, polyimide; compounds which form adsorption layers, for example long-chain carboxylic acids, fatty acid esters, ethers, alcohols, amines, amides, imides; compounds which form layers through tribochemical reactions, for example saturated fatty acids, phosphoric acid esters; compounds which form polymer-like layers, for example ethoxylated dicarboxylic acid partial esters, functionalized poly(meth)acrylates, unsaturated fatty acids, sulphurized olefins and organometallic compounds, for example molybdenum compounds (molybdenum dithiophosphates and molybdenum dithiocarbamates MoDTC) and their combinations with ZnDTPs, copper-containing organic compounds.

Some of the compounds listed above may fulfil multiple functions. ZnDTP, for example, is primarily an antiwear additive and an extreme pressure additive, but also has the character of an antioxidant and a corrosion inhibitor (here: metal passivator/deactivator).

The above-detailed additives are described in detail, inter alia, in T. Mang, W. Dresel (eds.): "Lubricants and Lubrication", Wiley-VCH, Weinheim 2001; R. M. Mortier, S. T. Orszulik (eds.): "Chemistry and Technology of Lubricants".

Preferably, the total concentration of the one or more additive (D) is up to 20% by weight, more preferably 0.05% to 15% by weight, based on the total weight of the polymeric-inorganic nanoparticle composition.

Preferably, the amounts of components (A) to (D) add up to 100% by weight, based on the total weight of the polymeric-inorganic nanoparticle composition.

EXPERIMENTAL PART

The invention is further illustrated in detail hereinafter with reference to examples and comparative examples, without any intention to limit the scope of the present invention.

Abbreviations $C_1$ AMA $C_1$-alkyl methacrylate (methyl methacrylate; MMA)

$C_4$ AMA $C_4$-alkyl methacrylate (n-butyl methacrylate; BMA)

$C_{12-14}$ AMA $C_{12-14}$-alkyl methacrylate (lauryl methacrylate; LMA)

$C_{12-15}$ AMA $C_{12-15}$-alkyl methacrylate (dodecyl pentadecyl methacrylate; DPMA)

DMAEMA dimethylaminoethylmethacrylate

DMAPMA N-3-Dimethylaminopropylmethacrylamid

Oxa oxazolidinylethyl (meth)acrylate

MEMO 3-(Trimethoxysilyl)propyl methacrylate

CTA chain transfer agent $f_{branch}$ degree of branching in mol %

$M_n$ number-average molecular weight $M_w$ weight-average molecular weight

PDI polydispersity index, molecular weight distribution calculated via $M_w/M_n$ NB3020 Nexbase®3020, Group III base oil from Neste with a $KV_{40}$ of 7.7 cSt (ASTM D-445) and a flash point of >150° C. (ASTM D-93)

NB3043 Nexbase*3043, Group III base oil from Neste with a $KV_{40}$ of 20 cSt (ASTM D-445) and a flash point of >220° C. (ASTM D-92)

Tetrabutane tetrabutane (branched $C_{16}$ and $C_{20}$ saturated hydrocarbon isomers) with a $KV_{40}$ of 4.2 cSt (ASTM D-445) and a flash point of 124° C. (ASTM D-93)

PAO synthetic polyalphaolefin, Group IV base oil with a $KV_{40}$ of 5.2 cSt (ASTM D-445) and a flash point of 130° C. (ASTM D-93)

$Al_2O_3$ 1 fumed $Al_2O_3$ (surface area: 85-115 $m^2/g$ according to ISO 9277) particles $Al_2O_3$ 2 fumed $Al_2O_3$ (surface area: 55-75 $m^2/g$ according to ISO 9277) particles $TiO_2$ 1 fumed $TiO_2$ (surface area: 35-65 $m^2/g$ according to ISO 9277) particles $TiO_2$ 2 fumed $TiO_2$ (surface area: 75-105 $m^2/g$ according to ISO 9277) particles Preparation of Polymer Compounds (B) According to the Invention As described above, the polymer number-average molecular weights ($M_n$) were measured by gel permeation chromatography (GPC) calibrated using polymethylmethacrylate (PMMA) calibration standards. Tetrahydrofuran (THF) is used as eluent.

Example Polymer 1 (P1) as Polymer Compound (B): Preparation of an Amine-Containing Copolymer According to the Invention 200 grams of NB3043, 11.34 grams of n-3-dimethylaminopropylmethacrylamid (DMAPMA), 272.21 grams of lauryl methacrylate ($C_{12-14}$ AMA, 5.53 grams of n-dodecyl mercaptan (n-DDM), 5.53 grams of 2-Ethylhexylthioglycolate (TGEH) were charged into 2 liter, 4-necked round bottom flask. The reaction mixture was stirred using a C-stirring rod, inerted with nitrogen, and heated to 90° C. Once the reaction mixture reached the setpoint temperature, 2.83 grams t-butylperoctoate was fed into the reactor over 2 hours. After 2 hours the mixture was heated up to 100° C. and after reaching the setpoint 1.42 grams of t-butylper-2-ethylhexanoate and 1.13 grams of tert-butylperoxypivalate were fed in one hour. Residual monomer was measured by gas chromatography to ensure good monomer conversion. The polymer obtained has a number-average molecular weight Mn of 6,500 g/mol (PMMA standard).

Example Polymer 2 (P2) as Polymer Compound (B)—Preparation of an Oxazolidinyl-Containing Copolymer According to the Invention Same preparation as for Polymer 1. The final polymer obtained has a number-average molecular weight Mn of 9,400 g/mol (PMMA standard).

Example Polymer 3 (P3) as Polymer Compound (B)—Preparation of a Amine-Containing Copolymer According to the Invention Same preparation as for Polymer 1. The final polymer obtained has a number-average molecular weight Mn of 29,000 g/mol (PMMA standard).

Example Polymer 4 (P4) as Polymer Compound (B)—Preparation of an Amine-Containing Copolymer According to the Invention Same preparation as for Polymer 1. The final polymer obtained has a number-average molecular weight Mn of 65,000 g/mol (PMMA standard).

Example Polymer 5 (P5) as Polymer Compound (B)—Preparation of a Amine-Containing Copolymer According to the Invention Same preparation as for Polymer 1. Polymerization set point temperature is in this case 80° C., instead of 90 and 100° C. The final polymer obtained has a number-average molecular weight Mn of 15,000 g/mol (PMMA standard).

Example Polymer 6 (P6) as Polymer Compound (B)—Preparation of a Silicon Containing Copolymer According to the Invention Same preparation as for Polymer 1. The final polymer obtained has a number-average molecular weight Mn of 7,100 g/mol (PMMA standard).

For the examples P1, P2, P3, P4, P5 and P6, the monomer components add up to 100%. The amount of initiator and chain transfer agent is given relative to the total amount of monomers. Table 4 below shows the monomer composition and reactants to prepare the polymers P1, P2, P3, P4, P5 and P6, as well as its final characterization.

TABLE 4

Composition, number-average molecular weight and PDI of polymers according to the present invention

| Ex | $C_1$ AMA [wt %] | $C_4$ AMA [wt %] | $C_{12-14}$- AMA [wt %] | $C_{12-15}$- AMA [wt %] | $C_{16-20}$- AMA [wt %] | Oxa [wt%] | MEMO [wt %] | DMAPMA [wt %] | DMAEMA [wt %] | Initiator [wt %] | CTA [wt %] | $M_n$ [g/mol] | PDI |
|---|---|---|---|---|---|---|---|---|---|---|---|---|---|
| P1 | — | — | 96 | — | — | — | — | 4 | — | 1.9 | 3.9 | 6,500 | 1.58 |
| P2 | 12 | — | 84 | — | — | 4 | — | — | — | 1.9 | 3.9 | 9,400 | 2.14 |
| P3 | — | — | 96 | — | — | — | — | 4 | — | 0.75 | 0.5 | 29,000 | 2.05 |
| P4 | 5 | — | — | 91 | — | — | — | 4 | — | 0.17 | 0.13 | 65,000 | 2.57 |
| P5 | — | 0.5 | — | 52.6 | 17.0 | — | — | — | 29.9 | 1.5 | 1.0 | 15,000 | 1.90 |
| P6 | — | — | 90 | — | — | — | 10 | — | — | 1.9 | 3.9 | 7,100 | 1.72 |

Preparation of Polymeric-Inorganic Nanoparticle Compositions According to the Invention Dispersion IE1:

10 g of fumed $Al_2O_3$ 1 (surface area: 85-115 $m^2/g$ according to ISO 9277) particles are given into a solution of 85 g synthetic PAO including 5 g of P2 while this mixture is milled with ultrasound (ultrasound processor UP400S with 400 Watt, 24 kHz with Ti-sonotrode) for 60 minutes, respectively. The particle size distribution (measured in Tegosoft DEC oil using dynamic light scattering equipment, LA-950, Horiba Ltd., Japan) shows a d99 value of 219 nm.

Dispersion IE2:

10 g of fumed $Al_2O_3$ 1 (surface area: 85-115 $m^2/g$ according to ISO 9277) particles are given into a solution of 85 g NB3020 including 5 g of P1 while this mixture is milled with ultrasound (ultrasound processor UP400S with 400 Watt, 24 kHz with Ti-sonotrode) for 60 minutes, respectively. The particle size distribution (measured in Tegosoft DEC oil using dynamic light scattering equipment, LA-950, Horiba Ltd., Japan) shows a d99 value of 205 nm.

Dispersion IE3:

10 g of fumed $TiO_2$ 1 (surface area: 35-65 $m^2/g$ according to ISO 9277) particles are given into a solution of 85 g NB3020 including 5 g of P1 while this mixture is milled with ultrasound (ultrasound processor UP400S with 400 Watt, 24 kHz with Ti-sonotrode) for 60 minutes, respectively. The particle size distribution (measured in Tegosoft DEC oil using dynamic light scattering equipment, LA-950, Horiba Ltd., Japan) shows a d99 value of 182 nm.

Dispersion IE4:

10 g of fumed $Al_2O_3$ 1 (surface area: 85-115 $m^2/g$ according to ISO 9277) particles are given into a solution of 85 g tetrabutane including 5 g of P3 while this mixture is milled with ultrasound (ultrasound processor UP400S with 400 Watt, 24 kHz with Ti-sonotrode) for 60 minutes, respectively. The particle size distribution (measured in Tegosoft DEC oil using dynamic light scattering equipment, LA-950, Horiba Ltd., Japan) shows a d99 value of 172 nm.

Dispersion IE5:

10 g of fumed $Al_2O_3$ 1 (surface area: 85-115 $m^2/g$ according to ISO 9277) particles are given into a solution of 85 g tetrabutane including 5 g of P1 while this mixture is milled with ultrasound (ultrasound processor UP400S with 400 Watt, 24 kHz with Ti-sonotrode) for 60 minutes, respectively. The particle size distribution (measured in Tegosoft DEC oil using dynamic light scattering equipment, LA-950, Horiba Ltd., Japan) shows a d99 value of 189 nm.

Dispersion IE6:

10 g of fumed $TiO_2$ 1 (surface area: 35-65 $m^2/g$ according to ISO 9277) particles are given into a solution of 85 g tetrabutane including 5 g of P1 while this mixture is milled with ultrasound (ultrasound processor UP400S with 400 Watt, 24 kHz with Ti-sonotrode) for 30 minutes, respectively. The particle size distribution (measured in Tegosoft DEC oil using dynamic light scattering equipment, LA-950, Horiba Ltd., Japan) shows a d99 value of 244 nm.

Dispersion IE7:

10 g of fumed $TiO_2$ 1 (surface area: 35-65 $m^2/g$ according to ISO 9277) particles are given into a solution of 85 g tetrabutane including 5 g of P3 while this mixture is milled with ultrasound (ultrasound processor UP400S with 400 Watt, 24 kHz with Ti-sonotrode) for 30 minutes, respectively. The particle size distribution (measured in Tegosoft DEC oil using dynamic light scattering equipment, LA-950, Horiba Ltd., Japan) shows a d99 value of 266 nm.

Dispersion IE8:

10 g of fumed $TiO_2$ 1 (surface area: 35-65 $m^2/g$ according to ISO 9277) particles are given into a solution of 85 g NB3020 oil including 5 g of P1 while this mixture is milled with ultrasound (ultrasound processor UP400S with 400 Watt, 24 kHz with Ti-sonotrode) for 30 minutes, respectively. The particle size distribution (measured in Tegosoft DEC oil using dynamic light scattering equipment, LA-950, Horiba Ltd., Japan) shows a d99 value of 234 nm.

Dispersion IE9:

10 g of fumed $Al_2O_3$ 2 (surface area: 55-75 $m^2/g$ according to ISO 9277) particles are given into a solution of 85 g NB3020 including 5 g of P1 while this mixture is milled with ultrasound (ultrasound processor UP400S with 400 Watt, 24 kHz with Ti-sonotrode) for 60 minutes, respectively. The particle size distribution (measured in Tegosoft DEC oil using dynamic light scattering equipment, LA-950, Horiba Ltd., Japan) shows a d99 value of 219 nm.

Dispersion IE10:

10 g of fumed $Al_2O_3$ 1 (surface area: 85-115 $m^2/g$ according to ISO 9277) particles are given into a solution of 85 g NB3020 including 5 g of P4 while this mixture is milled with ultrasound (ultrasound processor UP400S with 400 Watt, 24 kHz with Ti-sonotrode) for 60 minutes, respectively. The particle size distribution (measured in Tegosoft DEC oil using dynamic light scattering equipment, LA-950, Horiba Ltd., Japan) shows a d99 value of 246 nm.

Dispersion IE11:

First, a pre-dispersion is produced. 20.0 kg of fumed $TiO_2$ 1 (surface area: 35-65 $m^2/g$ according to ISO 9277) is given into a mixture of 54 kg NB3043 including 6 kg P5 using a conventional dissolver equipment. This dispersion was treated within the dissolver for 30 min keeping the dissolver disc rotating at a speed of about 20 m/s. This pre-dispersion is processed using ultrahigh-pressure technology (jet mill equipment Sugino Ultimaizer HJP-25050). The pre-dispersion is set under pressure of 2,500 bar using the jet mill equipment and processed two times. Finally, the dispersion is diluted using NB3043 to a solid content of 15 wt % $TiO_2$ 1. The particle size distribution (measured in Tegosoft DEC oil using dynamic light scattering equipment, LA-950, Horiba Ltd., Japan) shows a d99 value of 225 nm.

Dispersion IE12:

First, a pre-dispersion is produced. 5.0 kg of fumed $TiO_2$ 2 (surface area: 75-105 $m^2/g$ according to ISO 9277) is given into a mixture of 43.0 kg NB3043 including 2 kg P6 using a conventional dissolver equipment. This dispersion was treated within the dissolver for 30 min keeping the dissolver disc rotating at a speed of about 20 m/s. This pre-dispersion is processed using ultrahigh-pressure technology (jet mill equipment Sugino Ultimaizer HJP-25050). The pre-dispersion is set under pressure of 1,400 bar using the jet mill equipment and processed two times. Afterwards, this process was repeated at a pressure of 2,500 bar. The particle size distribution (measured in Tegosoft DEC oil using dynamic light scattering equipment, LA-950, Horiba Ltd., Japan) shows a d99 value of 234 nm.

Dispersion IE13:

First, a pre-dispersion is produced. 20.0 kg of fumed $TiO_2$ 2 (surface area: 75-105 m2/g according to ISO 9277) is given into a mixture of 53 kg NB3043 including 7 kg P5 using a conventional dissolver equipment. This dispersion was treated within the dissolver for 30 min keeping the dissolver disc rotating at a speed of about 20 m/s. This pre-dispersion is processed using ultrahigh-pressure technology (jet mill equipment Sugino Ultimaizer HJP-25050). The pre-dispersion is set under pressure of 2,500 bar using the jet mill equipment and processed two times. Finally, the dispersion is diluted using NB3043 to a solid content of 15 wt % $TiO_2$ 2. The particle size distribution (measured in Tegosoft DEC oil using dynamic light scattering equipment, LA-950, Horiba Ltd., Japan) shows a d99 value of 183 nm.

Preparation of Comparative Examples

Dispersion CE1:

1 g of fumed $TiO_2$ 1 (surface area: 35-65 $m^2/g$ according to ISO 9277) particles are given into a solution of 18 g NB3043 oil while this mixture is treated with ultrasound (ultrasound processor UP400S with 400 Watt, 24 kHz with Ti-sonotrode) for 30 minutes, respectively. The particle size distribution (measured in Tegosoft DEC oil using dynamic light scattering equipment, LA-950, Horiba Ltd., Japan) shows a d99 value of 1,927 nm.

Dispersion CE2:

1 g of fumed $TiO_2$ 1 (surface area: 35-65 $m^2/g$ according to ISO 9277) particles are given into a solution of 18 g tetrabutane while this mixture is treated with ultrasound (ultrasound processor UP400S with 400 Watt, 24 kHz with Ti-sonotrode) for 30 minutes, respectively. The particle size distribution (measured in Tegosoft DEC oil using dynamic light scattering equipment, LA-950, Horiba Ltd., Japan) shows a d99 value of 1,850 nm.

Dispersion CE3:

0.46 g of fumed $Al_2O_3$ 1 (surface area: 85-115 $m^2/g$ according to ISO 9277) particles are given into a solution of 18 g tetrabutane while this mixture is treated with ultrasound (ultrasound processor UP400S with 400 Watt, 24 kHz with Ti-sonotrode) for 60 minutes, respectively. The particle size distribution (measured in Tegosoft DEC oil using dynamic light scattering equipment, LA-950, Horiba Ltd., Japan) shows a d99 value of 1,867 nm.

Dispersion CE4:

2 g of fumed $TiO_2$ 1 (surface area: 35-65 $m^2/g$ according to ISO 9277) particles are mixed with 1 g of oleyl-alcohol. After addition of 16 g tetrabutane, this mixture is treated with ultrasound (ultrasound processor UP400S with 400 Watt, 24 kHz with Ti-sonotrode) for 30 minutes, respectively. The particle size distribution (measured in Tegosoft DEC oil using dynamic light scattering equipment, LA-950, Horiba Ltd., Japan) shows a d99 value of 1,457 nm.

Dispersion CE5:

2 g of fumed $TiO_2$ 1 (surface area: 35-65 $m^2/g$ according to ISO 9277) particles are mixed with 1 g of Triton X-100. After addition of 16 g NB3020, this mixture is treated with ultrasound (ultrasound processor UP400S with 400 Watt, 24 kHz with Ti-sonotrode) for 30 minutes, respectively. The particle size distribution (measured in Tegosoft DEC oil using dynamic light scattering equipment, LA-950, Horiba Ltd., Japan) shows a d99 value of 1,608 nm.

Dispersion CE6:

1 g of fumed $Al_2O_3$ 1 (surface area: 85-115 $m^2/g$ according to ISO 9277) particles are mixed with 0.5 g of oleyl-alcohol. After addition of 16 g tetrabutane, this mixture is treated with ultrasound (ultrasound processor UP400S with 400 Watt, 24 kHz with Ti-sonotrode) for 60 minutes, respectively. The particle size distribution (measured in Tegosoft DEC oil using dynamic light scattering equipment, LA-950, Horiba Ltd., Japan) shows a d99 value of 1,635 nm.

Dynamic Light Scattering (DLS)

The particle size distribution was measured in Tegosoft DEC oil using the dynamic light scattering equipment LB-500 produced by Horiba Ltd.

Dynamic light scattering (DLS) is a technique in physics that can be used to determine the size distribution profile of small particles in suspension or polymers in solution. This equipment can be used to measure the particle size of dispersed material (inorganic nanoparticles or polymeric spheres, e.g.) in the range from 3 nm to around 6 μm. The measurement is based on the Brownian motion of the particles within the medium and the scattering of incident laser light due to a difference in refraction index of liquid and solid material.

The resulting value is the hydrodynamic diameter of the particle's corresponding sphere. The values d50, d90 and d99 are common standards for discussion, as these describe the hydrodynamic diameter of the particle below which 50%, 90% or 99% of the particles are within the particle size distribution. The lower these values, the better the particle dispersion. Monitoring these values can give a clue about the particle dispersion stability. If the values increase tremendously, the particles are not stabilized enough and may tend to agglomerate and sediment over time resulting in a lack of stability. Depending on the viscosity of the medium, it can be stated, that a d99 value of <500 nm (e.g. for Nexbase base oil) is an indication for a stable dispersion as the particles are held in abeyance over time.

Dynamic Viscosity

The dynamic viscosity was measured with the Physica MCR 300 from Anton Paar using the rotational viscosity method and a single gap cylinder CC 27.

The motor of the viscometer drives a bob inside a fixed cup. The rotational speed of the bob is preset and produces a certain motor torque that is needed to rotate the measuring bob. This torque must overcome the viscous forces of the tested substance and is therefore a measure for its viscosity.

Data are measured at a shear rate of 100 s-1 and 23° C.

Visual Appearance/Stability

A stability test was conducted for each sample by diluting a small amount of concentrate to 1 wt % and 0.1 wt % solution of the inorganic nanoparticle, i.e weight % of particle. The dilution was prepared by blending the concentrate in a 50 mL glass bleaker at room temperature for one hour. Each dilution was placed in 5 mL glass vial and allowed to stay at room temperature. The vials were checked after blending, after one week and four weeks thereafter for signs of sedimentation. The sedimentation was classified into 5 categories: no sedimentation (no particles settled at the bottom of the vial), minor sedimentation (some particles start to settle at the bottom of the vial), moderate sedimentation (thin layer at the bottom of the vial), nearly complete sedimentation (almost all particles have settled and supernatant is becoming clear).

Sedimentation over time is a clear stability judgement for dispersions containing particles in any kind. Over time, the particles will sediment to the ground of the vial. This is dependent on their size, mass and the viscosity of the base fluid, in general. A stable dispersion is characterized by the fact, that the particles are homogeneously dispersed in the medium and stabilized by known mechanism.

Thus, stability of nanoparticles in the dispersions is a clear prerequisite for heat transfer properties of nanofluids. The inventive examples provided below show higher stability with different stability tests and good thermal conductivity over a long period of time in comparison to the state-of-the art heat transfer nanofluids (see Tables 5 and 6). Therefore, the stability tests below were not only conducted at room temperature, which is usually easier to achieve, but also at higher temperatures and longer time periods (e.g. 16 h at 100° C., see Tables 7 and 8), which simulates the application of cooling an electric motor with maximum temperatures of about 100° C.

Comparative examples 1 to 3 (Comp. 1-3) are simple mixtures of inorganic nanoparticles not chemically modified with any kind of surfactant or additive in a base fluid.

Comparative examples 4 to 6 (Comp. 4-6) are patent examples from U.S. Pat. No. 8,850,803 B2.

TABLE 5

| | | Comparative Examples | | | | | |
|---|---|---|---|---|---|---|---|
| Example # | | Comp. 1 | Comp. 2 | Comp. 3 | Comp. 4 | Comp. 5 | Comp. 6 |
| $Al_2O_3$ 1 | [wt %] | | | 2.3 | | | 5 |
| $TiO_2$ 1 | [wt %] | 5 | 55 | | 10 | 10 | |
| Oleyl alcohol | [wt %] | | | | 5 | | 2.5 |
| Triton X-100 | [wt %] | | | | | 5 | |
| NB3020 | [wt %] | 95 | | 97.7 | | 85 | |
| Tetrabutane | [wt %] | | 95 | | 85 | | 92.5 |
| Stability after 1 day | | +++ | ++ | +++ | +++ | +++ | +++ |
| Stability after 1 week | | +++ | +++ | +++ | +++ | +++ | +++ |
| Stability after 4 weeks | | +++ | +++ | +++ | +++ | +++ | +++ |

o: no sedimentation
Δ: very minor sedimentation
+: minor sedimentation
++: moderate sedimentation
+++: nearly complete sedimentation

TABLE 6

| | | Inventive Examples | | | | | | | | | | | | |
|---|---|---|---|---|---|---|---|---|---|---|---|---|---|---|
| Example # | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
| $Al_2O_3$ 1 | [wt %] | 10 | 10 | | 10 | 10 | | | | | 10 | | | |
| $Al_2O_3$ 2 | [wt %] | | | | | | | | | 10 | | | | |
| $TiO_2$ 1 | [wt %] | | | 10 | | | 10 | 10 | 10 | | | 15 | | |
| $TiO_2$ 2 | [wt %] | | | | | | | | | | | | 10 | 15 |
| Polymer P1 | [wt %] | | 5 | 5 | | 5 | 5 | | 3 | 3 | | | | |
| Polymer P2 | [wt %] | 5 | | | | | | | | | | | | |
| Polymer P3 | [wt %] | | | | 5 | | | 5 | | | | | | |
| Polymer P4 | [wt %] | | | | | | | | | | 5 | | | |
| Polymer P5 | [wt %] | | | | | | | | | | | 4.5 | | 5.25 |
| Polymer P6 | [wt %] | | | | | | | | | | | | 4 | |
| NB3020 | [wt %] | | 85 | 85 | | | | | 87 | 87 | 85 | | | |
| Tetrabutane | [wt %] | | | | 85 | 85 | 85 | 85 | | | | | | |

TABLE 6-continued

| Example # | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|
| | | Inventive Examples | | | | | | | | | | | | |
| PAO | [wt %] | 85 | | | | | | | | | | | | |
| NB3043 | [wt %] | | | | | | | | | | | 80.5 | 86 | 79.75 |
| polymer amount rel. to particle | | 50% | 50% | 50% | 50% | 50% | 50% | 50% | 30% | 30% | 50% | 30% | 40% | 30% |
| Stability after 1 day | | ○ | ○ | ○ | ○ | ○ | ○ | ○ | ○ | ○ | ○ | ○ | ○ | ○ |
| Stability after 1 week | | ○ | ○ | Δ | ○ | ○ | Δ | Δ | ○ | ○ | ○ | ○ | ○ | ○ |
| Stability after 4 weeks | | ○ | ○ | Δ | ○ | ○ | Δ | Δ | Δ | ○ | ○ | ○ | ○ | ○ |

○: no sedimentation
Δ: very minor sedimentation
+: minor sedimentation
++: moderate sedimentation
+++: nearly complete sedimentation.

Stability Test at 100° C. (Change of Viscosity)

The corresponding dispersions of Table 6 were taken and diluted to a 1 wt %, 5 wt % and 10 wt % concentration of nanoparticles in the dispersions (see Table 7). Dynamic viscosity and thermal conductivity of these samples were measured. An aliquot was filled into glass vials and stored in an oven at 100° C. for 16 h (overnight). After the dispersion was cooled down to room temperature, its dynamic viscosity and thermal conductivity was measured again.

TABLE 7

Viscosity of the Inventive Examples measured at room temperature (23° C.) before and after storage of the dispersion at 100° C.

| Concentration | | 10 wt % | | 5 wt % | | 1 wt % | | Base fluid (reference) | |
|---|---|---|---|---|---|---|---|---|---|
| | | Viscosity | Change after 16 h | Viscosity | Change after 16 h | Viscosity | Change after 16 h | Viscosity | Change after 16 h |
| Example No. | Particle | [mPas] | 100° C. | [mPas] | 100° C. | [mPas] | 100° C. | [mPas] | 100° C. |
| Ex. 1 | $Al_2O_3$ 1 | 17.7 | ○ | 11.8 | ○ | 9.0 | ○ | 8.3 | ○ |
| Ex. 2 | $Al_2O_3$ 1 | 19.9 | ○ | 14.6 | ○ | 11.6 | ○ | 10.8 | ○ |
| Ex. 3 | $TiO_2$ 1 | 16.4 | ○ | 13.2 | ○ | 11.6 | ○ | 10.8 | ○ |
| Ex. 4 | $Al_2O_3$ 1 | 19.5 | ○ | 9.4 | ○ | 5.8 | ○ | 5.4 | ○ |
| Ex. 5 | $Al_2O_3$ 1 | 16.9 | Δ | 8.9 | ○ | 6.1 | ○ | 5.4 | ○ |
| Ex. 6 | $TiO_2$ 1 | 17.8 | ○ | 9.1 | ○ | 5.9 | ○ | 5.4 | ○ |
| Ex. 7 | $TiO_2$ 1 | 11.5 | ○ | 7.6 | ○ | 5.7 | ○ | 5.4 | ○ |
| Ex. 8 | $TiO_2$ 1 | 30.7 | ○ | 18.2 | ○ | 12.3 | ○ | 10.8 | ○ |
| Ex. 9 | $Al_2O_3$ 2 | 20.0 | ○ | 14.5 | ○ | 11.5 | ○ | 10.8 | ○ |
| Ex. 10 | $Al_2O_3$ 1 | 77.3 | Δ | 17.4 | ○ | 12.8 | ○ | 10.8 | ○ |
| Ex. 11 | $TiO_2$ 1 | 44.5 | ○ | 37.7 | ○ | 34.7 | ○ | 33.8 | ○ |
| Ex. 12 | $TiO_2$ 2 | 49.1 | ○ | 39.5 | ○ | 34.4 | ○ | 33.8 | ○ |

○: no change of viscosity (<5% difference to original value)
Δ: very minor change of viscosity (>5%)
+: minor change of viscosity (>10%)
++: moderate change of viscosity (>30%)
+++: big change of viscosity (>50%)

During the storage at 100° C. dynamic processes between particles and fluid media are enhanced due to higher kinetic energy, which may lead to reagglomeration and or precipitation of nanoparticles in the dispersion. Thus, an increase of viscosity of more than 10% means that the stability of the dispersion is not fulfilled.

As shown below in table 7 the inventors of the present invention were able to prepare nanoparticle dispersions for use as heat transfer fluids with not only good thermal conductivity, but also good stability under given requirements for heat transfer fluids.

In contrast, the comparative examples could not be measured due to their instability after storage for one day, even at room temperature. Thus, a stability test at elevated temperatures (e.g. 16 h at 100° C.), which simulates the application of cooling an electric motor with maximum temperatures of about 100° C., was not even possible.

Determination of thermal conductivity by the LAMBDA device, Flucon GmbH The determination of the thermal conductivity is performed by the hot wire method. The hot wire of the LAMBDA serves as the source of the heat and as transducer at the same time. In order to raise the temperature, the hot-wire is subjected to a constant measuring current; as the surrounding medium warms up, the resistance of the hot-wire will change in accordance with the thermal viscosity of the surrounding medium. Thus, the change of voltage in the hot wire indicates the change of temperature taking place in the surrounding medium. The measuring range is from 10-2000 mW/m*K.

Data are measured after thematicization via PT 100 platinum thermometer of the measuring device in a metal block thermostat at 40° C. and 100° C. These temperatures are chosen, because these temperatures are meaningful for important applications.

As shown in Table 8 below, the use of the polymeric-inorganic nanoparticle compositions according to the invention as heat transfer fluids is advantageous because, not only stability of the inorganic nanoparticles in the dispersion is kept over time as shown in Table 6, but also the inventive polymeric-inorganic nanoparticle compositions provide improved thermal conductivity when used as heat transfer fluids compared to the state-of-the-art heat transfer base oil references. Moreover, as shown in Table 7, the addition of inorganic nanoparticles does not have a big impact on the viscosity change, which was unexpected and is advantageous.

and also to high copper corrosion. A pass load stage is achieved after 21700 revelations without harm to the teeth of the gear according to the DIN ISO 14635-2. The group III base oil NB 3043 alone has a FLS of 4 in this test.

Cu-Corrosion Test:

Copper corrosion data were collected according ASTM D130 @ 160° C. with the dispersion IE13-0.5:

3 h at 160° C.: Result 1b 72 h at 160° C.: Result 1b 168 h at 160° C.: Result 1b

TABLE 8

Results from thermal conductivity measurement at 40° C. before and after storage of the corresponding dispersion at 100° C.

| Concentration | | 10 wt % | | 5 wt % | | 1 wt % | | Base fluid (reference) | |
|---|---|---|---|---|---|---|---|---|---|
| | | Thermal conductivity 40° C. | Change after 16 h | Thermal conductivity 40° C. | Change after 16 h | Thermal conductivity 40° C. | Change after 16 h | Thermal conductivity 40° C. | Change after 16 h |
| Example No. | Particle | [mW/m*K] | at 100° C. | [mW/m*K] | at 100° C. | [mW/m*K] | at 100° C. | [mW/m*K] | at 100° C. |
| Ex. 1 | $Al_2O_3$ 1 | 156.1 | ○ | 147.6 | ○ | 141.1 | 0 | 138.0 | ○ |
| Ex. 2 | $Al_2O_3$ 1 | 142.8 | ○ | 134.9 | ○ | 128.6 | ○ | 126.0 | ○ |
| Ex. 3 | $TiO_2$ 1 | 142.7 | ○ | 135.1 | ○ | 129.3 | ○ | 126.0 | ○ |
| Ex. 4 | $Al_2O_3$ 1 | 147.1 | ○ | 134.2 | ○ | 126.5 | ○ | 122.0 | ○ |
| Ex. 5 | $Al_2O_3$ 1 | 141.3 | ○ | 132.4 | ○ | 126.5 | ○ | 122.0 | ○ |
| Ex. 6 | $TiO_2$ 1 | 146.0 | ○ | 134.0 | ○ | 125.5 | ○ | 122.0 | ○ |
| Ex. 7 | $TiO_2$ 1 | 139.5 | ○ | 131.3 | ○ | 125.5 | ○ | 122.0 | ○ |
| Ex. 8 | $TiO_2$ 1 | 150.7 | ○ | 138.2 | ○ | 130.5 | ○ | 126.0 | ○ |
| Ex. 9 | $Al_2O_3$ 2 | 145.6 | ○ | 135.5 | ○ | 129.3 | ○ | 126.0 | ○ |
| Ex. 10 | $Al_2O_3$ 1 | 147.8 | ○ | 136.5 | ○ | 129.5 | ○ | 126.0 | ○ |
| Ex. 11 | $TiO_2$ 1 | 158.5 | ○ | 150.2 | ○ | 144.4 | ○ | 143.5 | ○ |
| Ex. 12 | $TiO_2$ 2 | 157.7 | ○ | 150.6 | ○ | 144.3 | ○ | 143.5 | ○ |

○: no change of thermal conductivity (<1%)

Δ: very minor change of thermal conductivity (>1%)

+: minor change of thermal conductivity (>3%)

++: moderate change of thermal conductivity (>5%)

+++: big change of thermal conductivity (>10%)

As shown in the experimental part above, it can be concluded that the comparative dispersions cannot be used as heat transfer nanofluids, because they do not even fulfill the stability criteria tests.

In contrast, it was demonstrated that the polymeric-inorganic nanoparticle compositions of the invention comprising metal or metalloid oxide nanoparticle, metal or metalloid nitride nanoparticle, metal or metalloid carbide nanoparticle, or a mixture thereof, are stable over a long period of time at conditions close to application (16 h at 100° C.) as heat transfer fluids, without losing dispersion stability (viscosity) and thermal conductivity performance.

Load Capacity Test:

The dispersion IE13 was taken and diluted in NB 3043 to a 0.5 wt % concentration of nanoparticles in the dispersion (IE13-0.5).

It was conducted an FZG scuffing test according to DIN ISO 14635-2 with 90° C. (A10/16.6R/90) with the dispersion IE13-0.5. It resulted in a pass load stage 12 with 0 $mm^2$ summed total area of physical appearance and pinion gear weight loss of 6 mg and wheel weight loss of 12 mg, in total a weight loss of 18 mg. The highest pass load stage in this test is 12. Therefore, it can be shown that inorganic nanoparticle compositions according to the invention can provide excellent load capacity performance. A high failure load stage is required to protect the gears from damage over the lifetime. Typical transmission systems have a Failure Load Stage (FLS) of 8 to 10. However, this can only be achieved by using sulfur containing additives leading to aging issues There is a copper strip immersed in the oil over a specified time and temperature. After the test the copper stripe shows a certain color change. The color change is directly correlated with the copper corrosion. The copper corrosion is classified according to a table indicating the different colors of the stripes from 1a to 4c. A value of 1b indicates slight tarnish, which confirms no copper corrosion.

Filterability Test:

The filterability of the dispersion IE13-0.5 was tested according to the Scania filtration test STD 4263, 2009-04 method indicating the filterability of a lubricating oil, e.g. a transmission fluid. The higher the FI and FII values the better is the filterability. If the FII value is over 90%, the test according to this method is passed successfully. In the filterability test according to this method the dispersion IE13-0.5 had a FI value of 96.4% and a FII value of 91.5%.

The FZG scuffing test and the copper corrosion test show the advantages of the composition according to the invention. Having an excellent load capacity without any copper corrosion in a transmission fluid was unexpected.

For the sake of clarity, Table 9 below summarizes the results obtained with the dispersion IE13-0.5 in the FZG scuffing, copper corrosion and Scania filtration tests.

TABLE 9

| Test method | IE13-0.5 |
|---|---|
| FZG (A10/16.6R/90) | >12 |

TABLE 9-continued

| Test method | IE13-0.5 |
|---|---|
| Cu corrosion ASTM D-130 3 h/72 h/168 h @160° C. | lb/lb/lb |
| Scania STD 4263, 2009-04 (5 μm pore size) | FI: 96.4%; FII: 91.5% |

The invention claimed is:

1. A heat transfer fluid comprising a dispersion, the dispersion comprising dispersed inorganic nanoparticles, and further comprising a dispersed polymer, wherein the dispersion is obtained by milling a mixture, the mixture comprising one or more inorganic nanoparticle compound (A) and one or more polymer compound (B),
- (A) wherein the one or more inorganic nanoparticle compound is selected from the group consisting of a metal or a metalloid oxide nanoparticle, a metal or a metalloid nitride nanoparticle, a metal or a metalloid carbide nanoparticle, and a mixture thereof, and
- (B) wherein the one or more polymer compound is obtained by polymerizing a monomer composition comprising:
- a) from 1 to 35% by weight, based on the total weight of the monomer composition, of one or more functional monomer selected from the group consisting of:
- a1) aminoalkyl (meth)acrylates and aminoalkyl (meth) acrylamides;
- a2) nitriles of alkyl (meth)acrylic acid and other nitrogen-containing alkyl (meth)acrylates;
- a3) (meth)acrylates of ether alcohols;
- a4) oxiranyl alkyl (meth)acrylate;
- a5) phosphorus- and/or boron-containing alkyl (meth) acrylates;
- a6) heterocyclic alkyl (meth)acrylates;
- a7) vinyl halides;
- a8) vinyl esters;
- a9) vinyl monomers containing aromatic groups;
- a10) heterocyclic vinyl compounds;
- a11) vinyl and isoprenyl ethers; and
- a12) methacrylic acid and acrylic acid,
- b) from 65 to 99% by weight of one or more alkyl (meth)acrylate monomer, wherein each alkyl group of the one or more alkyl (meth)acrylate monomer is independently linear, cyclic or branched and comprises from 1 to 40 carbon atoms, based on the total weight of the monomer composition, wherein the weight ratio of the one or more inorganic nanoparticle compound (A) to the one or more polymer compound (B) is 9:1 to 1:5, and the amount of monomers a) and b) of the monomer composition sum up to 100% by weight, based on the total weight of the monomer composition.

2. The heat transfer fluid according to claim 1, wherein the one or more polymer compound (B) has a number average molecular weight (Mn) of from 2,000 to 150,000 g/mol, determined by gel permeation chromatography using polymethylmethacrylate calibration standards and tetrahydrofuran as eluent.

3. The heat transfer fluid according to claim 1, wherein the one or more alkyl (meth)acrylate monomer b) comprises
- b1) from 0 to 20% by weight of one or more alkyl (meth)acrylate of formula (I), as first component b):

(I)

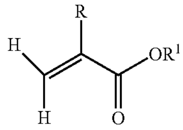

wherein R is hydrogen or methyl, $R^1$ means a linear, branched or cyclic alkyl residue with from 1 to 8 carbon atoms based on the total weight of the monomer composition,
- b2) from 45 to 99% by weight of one or more alkyl (meth)acrylate of formula (II), as second component b):

(II)

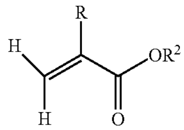

wherein R is hydrogen or methyl, R2 means a linear, branched or cyclic alkyl residue with 9 to 15 carbon atoms based on the total weight of the monomer composition, and
- b3) from 0 to 30% by weight of one or more alkyl (meth)acrylate of formula (III), as third component b):

(III)

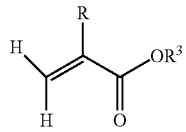

wherein R is hydrogen or methyl, R3 means a linear, branched or cyclic alkyl residue with 16 to 40 carbon atoms based on the total weight of the monomer composition.

4. The heat transfer fluid according to claim 1, wherein the weight ratio of the one or more inorganic nanoparticle compound (A) to the one or more polymer compound (B) is from 9:1 to 1:2.

5. The heat transfer fluid according to claim 1, wherein the one or more functional monomer a) is at least one selected from the group consisting of an aminoalkyl (meth)acrylate a1), an aminoalkyl (meth)acrylamide a1), and a heterocyclic alkyl (meth)acrylate a6).

6. The heat transfer fluid according to claim 5, wherein the one or more functional monomer a) is selected from the group consisting of N-(3-dimethy 1-aminopropy 1)methacrylamide, 2-dimethylaminoethy 1 (meth)acrylate, and oxazolidinylethyl (meth)acrylate.

7. The heat transfer fluid according to claim 1, wherein the inorganic nanoparticle compound (A) is at least one selected from the group consisting of titanium dioxide, aluminum oxide, and any mixture thereof.

8. The heat transfer fluid according to claim 1, comprising a base fluid (C), which has a kinematic viscosity at 40° C. from 3 cSt to 30 cSt according to ASTM D445 and a flash point higher than 110° C. according to ASTM D-93.

9. The heat transfer fluid according to claim 8, wherein the base fluid is selected from the group consisting of an API Group I base oil, an API Group II base oil, an API Group III base oil, an API Group IV base oil, an API Group V base oil, and a mixture thereof.

10. The heat transfer fluid according to claim 8, wherein the dispersion comprises from 80 to 99.9% by weight of the base fluid (C) and from 0.1 to 20% by weight of (A) and (B), based on the total weight of the dispersion.

11. The heat transfer fluid according to claim 8, wherein the amounts of (A), (B) and (C) sum up to 100% by weight, based on the total weight of the dispersion.

12. The heat transfer fluid according to claim 8, wherein the dispersion comprises from 88 to 99.5% by weight of a base fluid (C) and from 0.5 to 12% by weight of (A) and (B), based on the total weight of the dispersion.

13. The heat transfer fluid according to claim 1, wherein the dispersion comprising one or more nanoparticle (A), one or more polymer compound (B) and optionally a base fluid (C) is prepared via ultrahigh pressure technology.

14. The heat transfer fluid according to claim 1, wherein the heat transfer fluid further comprises at least one additive selected from the group consisting of antioxidants, anti-wear additives, extreme pressure additives, pour point depressants, demulsifiers, emulsifiers, corrosion inhibitors, metal passivators, rust inhibitors, electrostatic discharge depressants, defoaming agents, seal fix or seal compatibility agents, friction modifiers, dyes and a mixture thereof.

15. The heat transfer fluid according to claim 1, wherein the one or more alkyl (meth)acrylate monomer b) comprises b1) from 0 to 20% by weight of one or more alkyl (meth)acrylate of formula (I), as first component b):

(I)

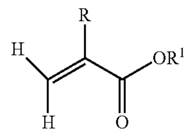

wherein R is hydrogen or methyl, $R^1$ means a linear, branched or cyclic alkyl residue with from 1 to 4 carbon atoms based on the total weight of the monomer composition, b2) from 45 to 99% by weight of one or more alkyl (meth)acrylate of formula (II), as second component b):

(II)

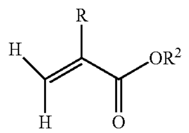

wherein R is hydrogen or methyl, R2 means a linear, branched or cyclic alkyl residue with 12 to 15 carbon atoms based on the total weight of the monomer composition, and b3) from 0 to 30% by weight of one or more alkyl (meth)acrylate of formula (III), as third component b):

(III)

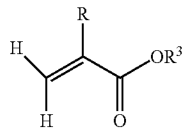

wherein R is hydrogen or methyl, $R^3$ means a linear, branched or cyclic alkyl residue with 16 to 22 carbon atoms based on the total weight of the monomer composition.

16. The heat transfer fluid according to claim 1, wherein the weight ratio of the one or more inorganic nanoparticle compound (A) to the one or more polymer compound (B) is from 3:1 to 1:1.

17. The heat transfer fluid according to claim 1, wherein the dispersion further comprises a base fluid (C), which has a kinematic viscosity at 40° C. from 3 cSt to 25 cSt according to ASTM D445 and a flash point higher than 110° C. according to ASTM D-93.

18. A battery comprising the heat transfer fluid according to claim 1.

19. An electrical equipment system comprising the heat transfer fluid according to claim 1, wherein the electrical equipment system is selected from the group consisting of electric batteries, electric motors, electric vehicle transmissions, electric transformers, electric capacitors, fluid-filled transmission lines, fluidfilled power cables, computers and power electronics.

20. A method for enhancing heat transfer and thermal conductivity in the heat transfer fluid of claim 1, the method comprising:

providing the dispersion in the heat transfer fluid, thereby enhancing heat transfer and thermal conductivity.

21. The method of claim 20, further comprising:

with the heat transfer fluid, providing heat transfer in a battery or other electrical equipment system having metal moving parts.

22. The method of claim 21, further comprising:

improving a high load capacity and/or avoiding copper corrosion in the battery or other electrical equipment system having metal moving parts.

* * * * *